United States Patent [19]

Kerner

[11] Patent Number: 5,649,655
[45] Date of Patent: Jul. 22, 1997

[54] LUGGAGE RACK FOR A MOTOR VEHICLE WITH A STEEPLY INCLINED END

[75] Inventor: Wolfgang Kerner, Rottenburg, Germany

[73] Assignee: Mercedes-Benz AG, Germany

[21] Appl. No.: 468,429

[22] Filed: Jun. 6, 1995

[30] Foreign Application Priority Data

Jun. 16, 1994 [DE] Germany ............... 44 21 030.2

[51] Int. Cl.⁶ .................. B60R 9/00; B60R 9/04
[52] U.S. Cl. ............................. 224/310; 414/462
[58] Field of Search .................. 224/309, 310, 224/328; 414/462

[56] References Cited

U.S. PATENT DOCUMENTS

| | | | |
|---|---|---|---|
| 2,714,462 | 8/1955 | Butler | 414/462 |
| 3,531,006 | 9/1970 | Farchmin | 414/462 |
| 3,720,334 | 3/1973 | Permut et al. | 414/462 |
| 4,291,823 | 9/1981 | Freeman et al. | 224/310 |
| 4,439,086 | 3/1984 | Thede | 224/310 |

FOREIGN PATENT DOCUMENTS

| | | |
|---|---|---|
| 33 18 891 | 11/1984 | Germany. |
| 92 17 122.2 | 3/1993 | Germany. |

*Primary Examiner*—Henry J. Recla
*Assistant Examiner*—Timothy L. Maust
*Attorney, Agent, or Firm*—Evenson, McKeown, Edwards & Lenahan P.L.L.P.

[57] ABSTRACT

A luggage rack for a motor vehicle with a steeply inclined end has a rear carrier on the steeply inclined end and a roof-mounted carrier. The rear carrier has a guide rail arrangement which corresponds to the gauge of guide rails of the roof-mounted carrier, as well as a lifting mechanism provided with a receiving device for securing and lifting a suitcase. The receiving device engages a receiving shaft of the suitcase in such a manner that, in an upper lifting position, the suitcase can be swivelled about the receiving shaft in the direction of the guide rails of the roof-mounted carrier. The suitcase may be provided with wheels which engage in the guide rails, or the suitcase may be attached to a dolly with wheels which engage in the guide rails.

20 Claims, 2 Drawing Sheets

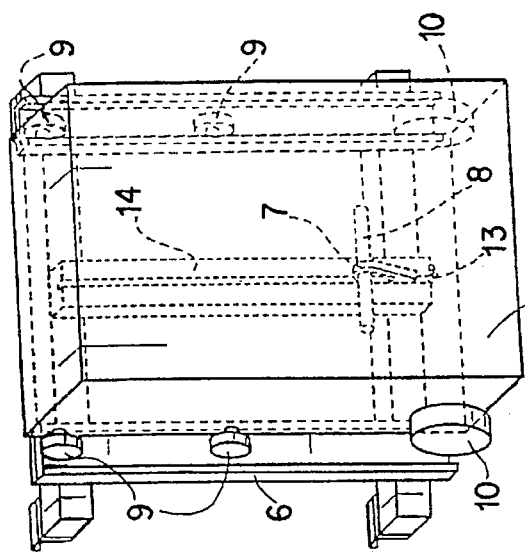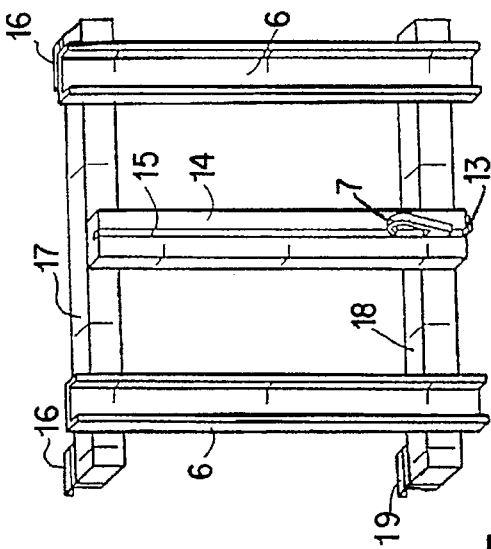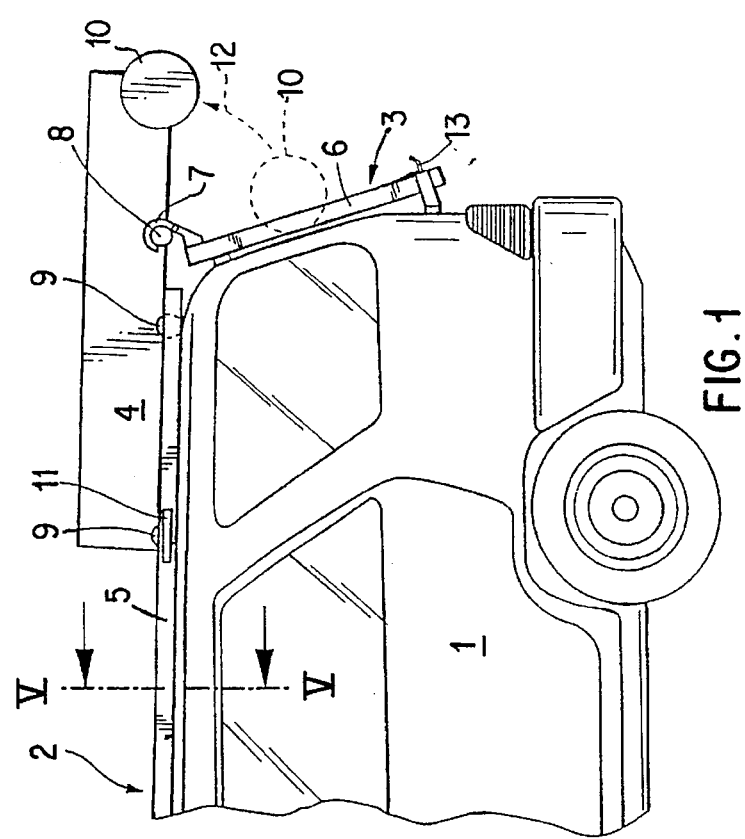

LUGGAGE RACK FOR A MOTOR VEHICLE WITH A STEEPLY INCLINED END

BACKGROUND AND SUMMARY OF THE INVENTION

This invention relates to a luggage rack for a motor vehicle which has a steeply inclined end, comprising a roof-mounted carrier provided with guide rails, a guide rail arrangement in the area of the steeply inclined end corresponding to the gauge of the guide rails of the roof-mounted carrier, and a lifting mechanism by means of which a suitcase, which can be swivelled about a horizontal receiving shaft, can be lifted onto the roof-mounted carrier along the guide rail arrangement.

A luggage rack of this type is known from U.S. Pat. No. 3,531,006. The motor vehicle disclosed there has a steeply inclined end and is provided with a roof-mounted carrier for receiving the luggage rack. The roof-mounted carrier has guide rails which continue in the downward direction in the area of the steeply inclined end. The guide rails form lateral boundaries for the guiding of a luggage rack which can be moved by means of a lifting mechanism from a lower, approximately vertical position in the area of the steeply inclined end into its roof position horizontally disposed on the roof-mounted carrier.

From German Patent Document DE-OS 33 18 891, a roof-mounted carrier for a passenger vehicle is known which has a bottom carrier which can be fastened on a vehicle roof as well as a top carrier which can be moved relative to the bottom carrier and accommodates the respective load object. The bottom carrier is provided with guide rails into which the top carrier can be suspended and can be slid and swivelled into a loading and unloading position situated laterally with respect to the vehicle. This type of a roof-mounted carrier can also be used for passenger cars with a steeply inclined end. However, the receiving capacity of the roof-mounted carrier is limited by its size and the maximally permissible roof load defined for the vehicle roof.

From German Patent Document DE 92 17 122 U1, another roof-mounted carrier for a roof of a motor vehicle is known which comprises guide rails fastened on the roof as well as a longitudinal frame which can be longitudinally moved in the guide rails by means of guide rollers. The frame carrier can be moved out of the roof-mounted carrier in the rearward direction and can be lowered downward into an oblique position in which it is supported on a rear edge of the motor vehicle. A receiving carrier for the load to be transported can be inserted into this frame carrier in the obliquely set loading and unloading position. In the transport position, all carriers on the motor vehicle roof are pushed into one another and locked with respect to one another.

It is an object of the present invention to provide a luggage rack of the above-mentioned type which, on the one hand, permits a loading and unloading without a large expenditure of force and, on the other hand, has a relatively high receiving capacity for pieces of luggage.

This object has been achieved according to the present invention by providing a guide rail arrangement as well as a lifting mechanism which are components of a separate rear carrier, in which case the lifting mechanism comprises a receiving device for securing and lifting the suitcase. The suitcase is disposed in such a manner about its horizontal receiving shaft that, in an upper lifting position of the receiving device, it can be swivelled about its horizontal receiving shaft toward the guide rails of the roof-mounted carrier. A rear carrier is provided in addition to the roof-mounted carrier which rear carrier may also be used for receiving at least one piece of luggage. Because of the lifting mechanism, it is also possible to move the suitcase without a large expenditure of force into the guide rails of the roof-mounted carrier. The guide rails of the rear carrier and of the roof-mounted carrier are coordinated with one another such that the suitcase is first lifted along the guide rail arrangement of the rear carrier and, after the swivelling into a position aligned with the vehicle roof, can be pushed into the guide rails of the roof-mounted carrier. No additional carrier is required for the suitcase so that, unless it is mounted on the rear carrier or on the roof-mounted carrier, the suitcase can be transported in a simple manner like a commercially available suitcase.

In an embodiment of the invention, the guide rails of the roof-mounted carrier are provided with a locking device for securing the suitcase from an unintentional swivelling back on the rear carrier. As a result, the problem is avoided that the suitcase, after being lifted along the rear carrier and swivelled in the direction of the guide rails of the roof-mounted carrier, can swivel back again onto the rear carrier because of its own weight.

In a further development of the invention, the receiving device is provided with a catching device, which receives the receiving shaft of the suitcase when the suitcase is being detached from the guide rails of the roof-mounted carrier to be lowered along the rear carrier. This prevents the problem of the suitcase falling off of the roof of the vehicle after being detached from the guide rails of the roof-mounted carrier.

In a further development of the invention, the suitcase is provided with at least one pair of rollers which can be inserted into the guide rails. This facilitates the sliding of the suitcase in the guide rails. In addition, in a known manner, the suitcase can be moved separately on rollers.

In a further development of the invention, the at least one pair of rollers is disposed on the suitcase. The suitcase therefore represents a system case which is specifically adapted to the luggage rack according to the invention.

In a further development of the invention, the at least one pair of rollers is provided on a frame rack equipped with a receiving shaft, on which rack the suitcase can be fastened. In the case of this embodiment, a commercially available suitcase can be used which is clamped onto the frame rack in a simple manner. The frame rack is constructed particularly as a slightly modified hand luggage dolly.

In a further development of the invention, one locking device respectively is provided on the roof-mounted carrier as well as on the rear carrier for locking the suitcase in a transport position. As a result, it is possible to fasten the suitcase or suitcases without any additional locking devices on the roof-mounted carrier or on the rear carrier.

In a further development of the invention, the lifting mechanism is provided with a driving device. This driving device may be constructed as a vehicle-supply-system-operated electric adjusting drive or as a vehicle-supply-system-operated hydraulic or pneumatic adjusting drive or as a manual/pneumatic adjusting drive, in which case the required working pressure is applied by a lever pump for a lifting operation. A lowering of the receiving device takes place by means of a pressure reduction.

In a further development of the invention, the lifting mechanism is provided with a return stop and a friction brake. This further development is advantageous in the case of a purely manual system in order to prevent an uncontrolled sliding-off or lowering when the suitcase is lifted along the rear carrier.

These and other objects, features and advantages of the present invention will become more readily apparent from the following detailed description when taken in conjunction with the accompanying drawings.

BRIEF DESCRIPTION OF THE DRAWINGS

FIG. 1 is a schematic lateral view of a rear area of a passenger vehicle provided with a steeply inclined end which is equipped with a roof-mounted carrier as well as with a rear carrier, according to the present invention;

FIG. 2 is a schematic perspective view of the system suitcase according to FIG. 1 arranged on the rear carrier;

FIG. 3 is a perspective view of the rear carrier according to FIG. 2, without the system suitcase fastened to it;

DETAILED DESCRIPTION OF THE DRAWINGS

Figure 4:
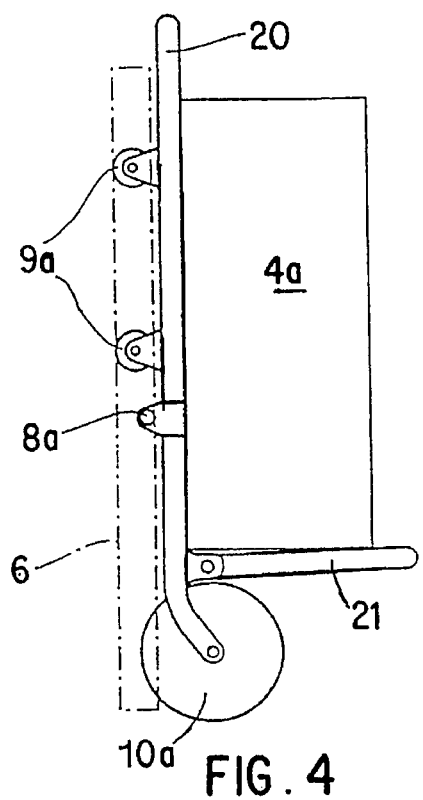
FIG. 4 is a lateral view of a suitcase clamped onto a frame rack of a hand luggage dolly, arranged on a rear carrier.

A passenger vehicle 1 according to FIG. 1 represents a station wagon, mini-van, or sport utility vehicle which is provided with a steeply inclined end. A roof-mounted carrier 2 is provided on a roof of the passenger vehicle 1. A rear carrier 3 is provided on the steeply inclined end of the passenger vehicle 1. The roof-mounted carrier 2 has two guide rails 5 which are arranged at a distance from one another and extend in parallel in the longitudinal direction over the roof, the profile of the guide rails 5 being constructed as illustrated in FIG. 4. In the following, this profile will be explained in detail. The guide rails 5 are fastened on the roof.

Figure 5:
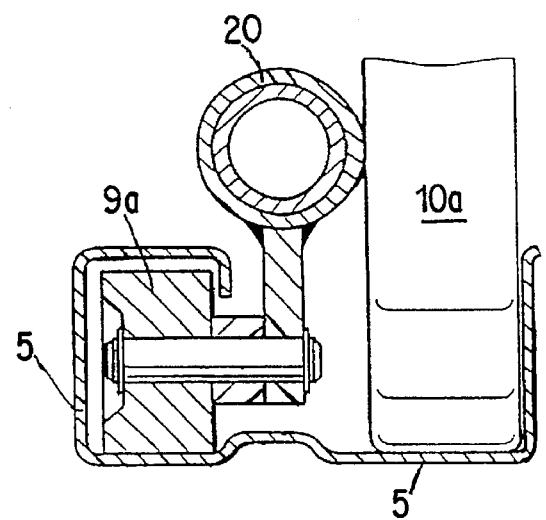
FIG. 5 is an enlarged cross-sectional view of a guide rail of the roof-mounted carrier according to FIG. 1 in which a bearing roller and a running wheel of the hand luggage dolly according to FIG. 4 are guided.

The rear carrier 3 is fastened on the steeply inclined end of the passenger vehicle 1 in an approximately vertically aligned manner and has two mutually parallel guide rails 6 which are arranged at a distance from one another and which are constructed as guide plates with a U-shaped cross section. The guide rails 6 are fastened on two transverse supports 17, 18. The two transverse supports 17, 18 are each mounted on the rear flap of the passenger vehicle 1 with a pair 16, 19 of rubber buffers and tenter hooks. The gauge, or distance between, the two guide rails 6 corresponds to that of the guide rails 5 of the roof-mounted carrier 2. Guide rails 6 as well as guide rails 5 are used for receiving a system suitcase 4 which has approximately the shape of a parallel-epiped and is provided with several pairs of rollers on both lateral sides. In the front and in the center, the system suitcase 4 has two small bearing rollers 9 respectively on either lateral side which project downward beyond the bottom of the system suitcase 4. In its rear area, the system suitcase 4 has one running wheel 10 respectively on either lateral side, which running wheel is significantly larger than the bearing rollers 9 and is provided with one rubber tire respectively. The U-shaped cross section of each of the two guide rails 6 of the rear carrier 3 is wide enough so that the small bearing rollers 9 as well as the significantly larger running wheels 10 can be guided in the guide rails 6. The bearing rollers 9 and the running wheels, as shown in FIG. 5, each have a different gauge. Relative to the bearing rollers 9, the running wheels 10 are arranged closer together. The guide rails 5 and the guide rails 6 are therefore aligned with one another in the longitudinal direction of the passenger vehicle 1, even when the guide rails 6 are arranged almost vertically on the steeply inclined end of the passenger car.

In order to be able to fasten the system suitcase 4 on the rear carrier 3 and to lift it, a lifting mechanism 14 is provided which has a receiving device 7. The lifting mechanism is arranged in a slotted housing which is fastened on the two transverse supports 17, 18 of the rear carrier 3 in the center between the two guide rails 6 (FIG. 3). The receiving device 7 is constructed as a claw which can be moved in a linear manner in the housing of the lifting mechanism 14 along a longitudinal slot 15 which is parallel to the guide rails 6. The receiving device 7 is longitudinally movable by means of the lifting mechanism 14 between a lower position in the area of the lower end of the guide rails 6 and an upper lifting position which is situated at the level of the roof edge of the passenger vehicle 1. In the proximity of its center of gravity, the system suitcase 4 has a receiving shaft 8 which is constructed in the manner of a rod and which extends transversely over an underside of the system suitcase. This rod-shaped receiving shaft 8 is received in a horizontal manner in the claw-type receiving device 7 of the lifting mechanism 14. The system suitcase 4 is held in the receiving device 7 so that it is hinged about the receiving shaft 8. In order to achieve a secure support of the system suitcase 4 on the rear carrier 3, the bearing rollers 9 and the running wheels 10 are supported in the guide rails 6. A stop 13 is provided on a lower end of the lifting mechanism. In the lower position of the receiving device 7, the system suitcase 4 is suspended into the receiving device, in which case the bearing rollers 9 and the running wheels 10 are supported in the guide rails 6 (FIG. 2).

In the case of the illustrated embodiment, the lifting mechanism 14 is constructed as a manual adjusting drive which is provided with a friction brake and a return stop. In embodiments of the invention which are not shown, electric, hydraulic, pneumatic or manual/pneumatic adjusting drives are provided in which case the system suitcase 4 can be lifted to the level of the roof without any expenditure of manual force. In the case of the illustrated embodiment, the system suitcase 4 is suspended in the receiving device 7 and is manually pushed upward in the guide rails 6. By means of a return stop, the system suitcase 4 is secured with respect to sliding downward. When the system suitcase 4 is to be lowered from a lifted position, a friction brake promotes a controlled lowering. As soon as the system body 4 has been pushed upward in the guide rails 7 so that the receiving device 7 has reached its upper lifting position in the area of the roof edge, the part of the system suitcase 4, including the bearing rollers 9, situated above the receiving shaft 8 projects freely upward out of the guide rails 6. In this position, the system suitcase 4 is now swivelled in the direction of the broken arrow 12 so far about the receiving shaft 8 until it is aligned in parallel to the roof of the passenger vehicle 1 so that the gauge of the bearing rollers 9 is aligned with the guide rails 5. As soon as the bearing rollers 9 of the system suitcase 4 come to rest on the guide rails 5 on the roof of the passenger vehicle 1, a locking device 11 of the roof-mounted carrier 2 becomes operative which prevents the system suitcase from swivelling in an uncontrolled manner back onto the rear carrier 3. This locking device 11 secures the system suitcase 4 only from swivelling about the receiving shaft 8, but allows an axial movement in the longitudinal direction of the passenger vehicle 1. The rearward ends of the guide rails 5 of the roof carrier 2 are arranged at a distance to the roof edge of the passenger vehicle 1 in such a manner that, after the swivelling in the direction of the arrow 12, the forward bearing rollers 9 of the system suitcase 4 are situated directly adjacent to and aligned with the open rear end of the guide rails 5. Each guide rail 5 has a combined C- and U-shaped cross section, in which case the C-shaped part is used for receiving the bearing rollers 9 and an upwardly open U-type part which is situated farther on the inside is used for guiding the running wheels 10. By means of the upwardly closed C-shaped part of the guide rails 5, the bearing rollers 9 are prevented from lifting off in the upward direction, whereby a secure linear guidance of the system suitcase 4 is achieved along the roof. After the locking of the system suitcase 4 by means of the locking device 11, the claw-type receiving device 7 releases the receiving shaft 8 of the system suitcase 4 so that the latter can be pushed along the roof toward the front of the vehicle. The system suitcase 4 is moved toward the front in the guide rails 5 of the roof-mounted carrier 2 until it has reached a defined transport position on the roof-mounted carrier 2. In this transport position, another locking device of the roof-mounted carrier becomes operative which secures and locks the system suitcase 4 in this position. After the lowering of the receiving device 7 without the system suitcase 4, it is possible to fasten another system suitcase 4 on the rear carrier 3 in a simple manner. An unloading of the system suitcase 4 from the roof-mounted carrier 2 takes place in the reverse order. First, the locking device of the roof-mounted carrier 2 is released. Then the system suitcase 4 is slid toward the rear until the receiving shaft 8 engages in the receiving device 7 of the rear carrier 3 moved into its upper lifting position. In this position, the receiving device 7 acts as a catching device which prevents the system suitcase 4 from falling off the roof.

The locking device 11, which is used as a swivel lock, is released and the system suitcase 4 is then swivelled about the receiving shaft 8 into the guide rails 6 of the rear carrier 3. Then the system suitcase 4 is moved downward by means of the lifting mechanism 14 until the receiving device 7 strikes against the stop 13, which partially unlocks the receiving device 7, allowing a removal of the system suitcase 4, but continuing to protect against a loss. The claw of the receiving device 7 is therefore open to such an extent that the system suitcase 4 can be removed in the upward direction but cannot slip out of the receiving device 7 toward the rear. In the case of an embodiment of the invention which is not shown, the receiving device 7 is provided with a lock against an unauthorized removal of the system suitcase 4.

Figure 6:
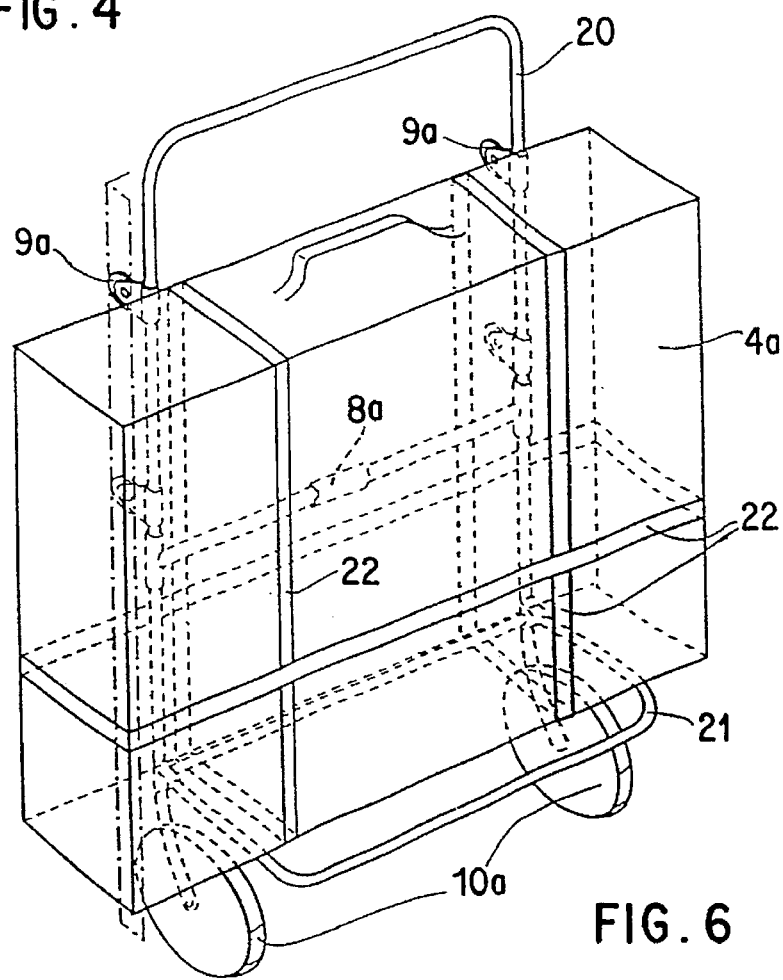
FIG. 6 is a perspective view of the suitcase according to FIG. 4 clamped onto the frame rack.

In order to be universally able to also mount commercially available suitcases 4a (FIGS. 4 to 6) on the roof-mounted carrier 2 and the rear carrier 3, a correspondingly modified hand luggage dolly is provided on which the suitcase 4a is buckled by means of belts 22. The hand luggage dolly has a frame rack 20, 21 which is constructed of bars or tubing and on which, corresponding to the system suitcase 4, two pairs of bearing rollers 9a as well as one pair of running wheels 10a are disposed. As illustrated in FIG. 5, the bearing rollers 9a are each fastened on a lateral bar of the frame rack 20, 21; the running wheels 10a, on the other hand, are fastened to the base of the frame rack 20, 21. As mentioned above, also in the case of the frame rack 20, 21 of the hand luggage dolly for the suitcase 4a, different gauges are provided for the bearing rollers 9a and the running wheels 10a. Also corresponding to the position of the receiving shaft 8 in the case of the system suitcase 4, a transverse rod 8a is provided on the frame rack and is rigidly connected with it. This transverse rod 8a is used as a receiving shaft which can be latched into the receiving device 7 of the lifting mechanism 14. If the suitcase 4a is not fastened on the rear carrier 3 or the roof-mounted carrier 2, it can be pulled or pushed by means of the hand luggage dolly in a known manner. Like a commercially available hand luggage dolly, the frame rack 20, 21 can be folded up and can be stored at a suitable location when it is not needed.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A luggage rack system for a motor vehicle which has a steeply inclined end, comprising:

a roof-mounted carrier comprising a first set of guide rails which are arranged essentially parallel to each other at a first distance apart;

a second carrier comprising a second set of guide rails and a lifting mechanism, said second set of guide rails being fastened to said steeply inclined end and being arranged essentially parallel to each other at said first distance apart, said second set of guide rails being separate from said first set of guide rails; and a luggage component comprising a horizontal receiving shaft and guiding portions which are engageable with said first and second sets of guide rails, said lifting mechanism including a receiving device configured to engage said horizontal receiving shaft of the luggage component, said lifting mechanism being movable parallel to said second set of guide rails to lift said luggage component to an upper position on said second carrier, said luggage component being swivellable at said upper position about said horizontal receiving shaft onto said roof-mounted carrier.

2. A luggage rack system according to claim 1, wherein the first set of guide rails are provided with a locking device for securing the luggage component from swivelling about the horizontal receiving shaft.

3. A luggage rack system according to claim 1, wherein the receiving device comprises a catching device which receives the receiving shaft of the luggage component when the luggage component is being removed from the roof-mounted carrier to be lowered along the second carrier.

4. A luggage rack system according to claim 1, wherein said guiding portions of the luggage component comprises at least one pair of rollers.

5. A luggage rack system according to claim 4, wherein said first set of guide rails at least partially comprise a C-shaped cross section, said luggage component being movable along said first set of guide rails after being swivelled onto said roof-mounted carrier such that at least one pair of said rollers is received in said C-shaped cross section.

6. A luggage rack system according to claim 4, wherein said second set of guide rails at least partially comprise a U-shaped cross section, at least one pair of said rollers being guided along said U-shaped cross section as said luggage component is being lifted.

7. A luggage rack system according to claim 5, wherein said second set of guide rails at least partially comprise a U-shaped cross section, at least one pair of said rollers being guided along said U-shaped section as said luggage component is being lifted.

8. A luggage rack system according to claim 4, wherein said luggage component comprises a suitcase including said horizontal shaft and said at least one pair of rollers.

9. A luggage rack system according to claim 4, wherein said luggage component comprises a luggage dolly including said horizontal shaft and said at least one pair of rollers.

10. A luggage rack system according to claim 1, wherein said lifting mechanism comprises a housing defining a longitudinal slot which is parallel to said second set of guide rails, said receiving device being slidable along said longitudinal slot.

11. A luggage rack system according to claim 4, wherein said lifting mechanism comprises a housing defining a longitudinal slot which is parallel to said second set of guide rails, said receiving device being slidable along said longitudinal slot.

12. A luggage rack system according to claim 7, wherein said lifting mechanism comprises a housing defining a longitudinal slot which is parallel to said second set of guide rails, said receiving device being slidable along said longitudinal slot.

13. A luggage rack system according to claim 1, wherein the lifting mechanism is provided with a return stop.

14. A luggage rack system for a motor vehicle which has a steeply inclined end, comprising:
    a roof-mounted carrier comprising a first set of guide rails which are arranged essentially parallel to each other at a first distance apart; and
    a second carrier comprising a second set of guide rails and a lifting mechanism, said second set of guide rails being fastened to said steeply inclined end and being arranged essentially parallel to each other at a second distance apart, said second set of guide rails being separate and free from contact with said first set of guide rails, said lifting mechanism having a receiving device configured to engage a horizontal receiving shaft of a luggage component, said lifting mechanism being movable parallel to said second set of guide rails to lift said luggage component to an upper position on said second carrier, said luggage component being swivellable at said upper position about said horizontal receiving shaft onto said roof-mounted carrier.

15. A luggage rack system according to claim 14, wherein said first distance is equal to said second distance.

16. A luggage rack system according to claim 14, wherein said first set of guide rails at least partially comprise a C-shaped cross section.

17. A luggage rack system according to claim 15, wherein said second set of guide rails at least partially comprise a U-shaped cross section.

18. A luggage rack system according to claim 16, wherein said second set of guide rails at least partially comprise a U-shaped cross section.

19. A luggage rack system according to claim 14, wherein said lifting mechanism comprises a housing defining a longitudinal slot which is parallel to said second set of guide rails, said receiving device being slidable along said longitudinal slot.

20. A luggage rack system according to claim 18, wherein said lifting mechanism comprises a housing defining a longitudinal slot which is parallel to said second set of guide rails, said receiving device being slidable along said longitudinal slot.

* * * * *